United States Patent
Lintz et al.

(10) Patent No.: US 9,531,822 B1
(45) Date of Patent: Dec. 27, 2016

(54) SYSTEM AND METHOD FOR RANKING CONVERSATIONS

(71) Applicant: Google Inc., Mountain View, CA (US)

(72) Inventors: Michael Lintz, San Francisco, CA (US); Kevin Brown, Bothell, WA (US); Hariharan Chandrasekaran, Mountain View, CA (US); Lucian Florin Cionca, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 569 days.

(21) Appl. No.: 13/894,058

(22) Filed: May 14, 2013

(51) Int. Cl.
*H04L 29/08* (2006.01)
*H04L 12/58* (2006.01)

(52) U.S. Cl.
CPC .............. *H04L 67/22* (2013.01); *H04L 51/10* (2013.01); *H04L 51/32* (2013.01); *H04L 67/24* (2013.01)

(58) Field of Classification Search
None
See application file for complete search history.

(56) References Cited

U.S. PATENT DOCUMENTS

| | | | | |
|---|---|---|---|---|
| 8,539,027 B1* | 9/2013 | Chen | | G06Q 50/01 709/202 |
| 8,700,540 B1* | 4/2014 | Zambrano | | G06Q 50/01 705/319 |
| 9,195,996 B1* | 11/2015 | Walsh | | G06Q 30/0269 |
| 2011/0252340 A1* | 10/2011 | Thomas | | G06Q 50/01 715/756 |
| 2012/0066053 A1* | 3/2012 | Agarwal | | G06Q 30/02 705/14.41 |
| 2013/0179511 A1* | 7/2013 | Stevens | | H04L 67/306 709/204 |
| 2013/0282706 A1* | 10/2013 | Yoo | | G06Q 30/02 707/723 |

* cited by examiner

*Primary Examiner* — Mohamed Ibrahim
(74) *Attorney, Agent, or Firm* — IP Spring

(57) ABSTRACT

Embodiments include identifying a plurality of communication sessions, each of the plurality of communication sessions having multiple participants. Embodiments may also include applying at least one parameter to each of the communication sessions and determining a non-adjusted value for the at least one parameter for each of the communication sessions. Embodiments may further include determining whether the at least one parameter has been assigned a predetermined weight adjustment. If the at least one parameter has been assigned a weight adjustment, adjusting the value for the at least one parameter based upon the predetermined weight assigned to each of the at least one parameter. Embodiments may include generating a combined value for each of the communication sessions based upon, at least in part, one or more of the non-adjusted value and the adjusted value and ranking each of the communication sessions based upon, at least in part, the combined value.

20 Claims, 5 Drawing Sheets

SYSTEM AND METHOD FOR RANKING CONVERSATIONS

TECHNICAL FIELD

This disclosure relates to video communication sessions and, more particularly, to a method of ranking various video communication sessions.

BACKGROUND

A social network may refer to an online system that provides a forum for geographically separated users to interact with one another, where those users have defined a relationship between one another. Users may control who can view their information by identifying particular relationships with other users, and can also find new users from the group of other people who are "friends" of their own friends. Social networks may be aimed at different types of social interaction, such as friendship and business networking. A user of a social network may have a profile page (e.g., a web page on the social network) that provides information about the user to other users of the social network. A profile may include information regarding a user's acquaintance relationships (e.g., friends, colleagues, schoolmates, etc.) on the social network.

Some social networking websites provide real-time broadcasted chat capabilities that may enable two or more individuals to broadcast their communication to a live audience. However, users are often unaware of which particular upcoming chat sessions would be of greatest interest to them, i.e. those that are relevant based upon their particular interests or are generally of higher quality.

SUMMARY OF DISCLOSURE

In one implementation, a method, in accordance with this disclosure, may include identifying, using one or more computing devices, a plurality of live social networking based communication sessions, each of the plurality of live social networking based communication sessions having multiple participants. The method may further include applying a plurality of parameters to each of the plurality of live social networking based communication sessions, the plurality of parameters including a number of participants, a popularity level of an organizer of each of the plurality of live social networking based communication sessions, and an affinity of a user to the conversation participants associated with each of the plurality of live social networking based communication sessions. The method may also include determining a value for each of the plurality of parameters for each of the plurality of live social networking based communication sessions. The method may include generating a combined value for each of the plurality of live social networking based communication sessions. The method may also include ranking each of the plurality of live social networking based communication sessions based upon, at least in part, the combined value and providing the ranking to one or more users.

In another implementation, a method, in accordance with this disclosure, may include identifying, using one or more computing devices, a plurality of live social networking based communication sessions, each of the plurality of live social networking based communication sessions having multiple participants. The method may further include applying at least one parameter to each of the plurality of live social networking based communication sessions. The method may also include determining a non-adjusted value for at least one parameter for each of the plurality of live social networking based communication sessions. The method may further include determining whether the at least one parameter has been assigned a predetermined weight adjustment. If the at least one parameter has been assigned a weight adjustment, the method may include adjusting the value for the at least one parameter based upon, at least in part, the predetermined weight assigned to each of the at least one parameter. The method may also include generating a combined value for each of the plurality of live social networking based communication sessions based upon, at least in part, one or more of the non-adjusted value and the adjusted value and ranking each of the plurality of live social networking based communication sessions based upon, at least in part, the combined value One or more of the following features may be included. In some embodiments, the at least one parameter may include a view count, and a user favorability count. In some embodiments, the at least one parameter may include a number of participants in a live communication session. The at least one parameter may include a popularity metric associated with an organizer of a live communication session. The at least one parameter may include an affinity of a user to one or more live communication session participants. The at least one parameter may include an affinity of a user to an organizer of a live communication session. The at least one parameter may include an average watch time associated with an organizer of a live communication session. The at least one parameter may include one or more of a reshare count, a comment count. The method may include determining a commonality metric between one or more user interests and a transcription of audio associated with a live communication session. In some embodiments, the popularity metric may include a number of followers on a social network.

In another implementation, a computing system is provided. In some embodiments, the computing system may include one or more processors configured to identify a plurality of live communication sessions and to apply at least one parameter to each of the plurality of live communication sessions. The one or more processors may be configured to determine a value for the at least one parameter for each of the plurality of live communication sessions. The one or more processors may be configured to generate a combined value for each of the plurality of live communication sessions and rank each of the plurality of live communication sessions based upon, at least in part, the combined value.

One or more of the following features may be included. In some embodiments, the at least one parameter may include one or more of a view count, and a user favorability count. The at least one parameter may include a number of participants in a live communication session. The at least one parameter may include a popularity metric associated with an organizer of a live communication session. The at least one parameter may include an affinity of a user to one or more live communication session participants. The at least one parameter may include an affinity of a user to an organizer of a live communication session. The at least one parameter may include an average watch time associated with an organizer of a live communication session. The at least one parameter may include one or more of a reshare count, a comment count. The one or more processors may be configured to determine a commonality metric between one or more user interests and a transcription of audio associated with a live communication session. The popularity metric may include a number of followers on a social network.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Figure 1:
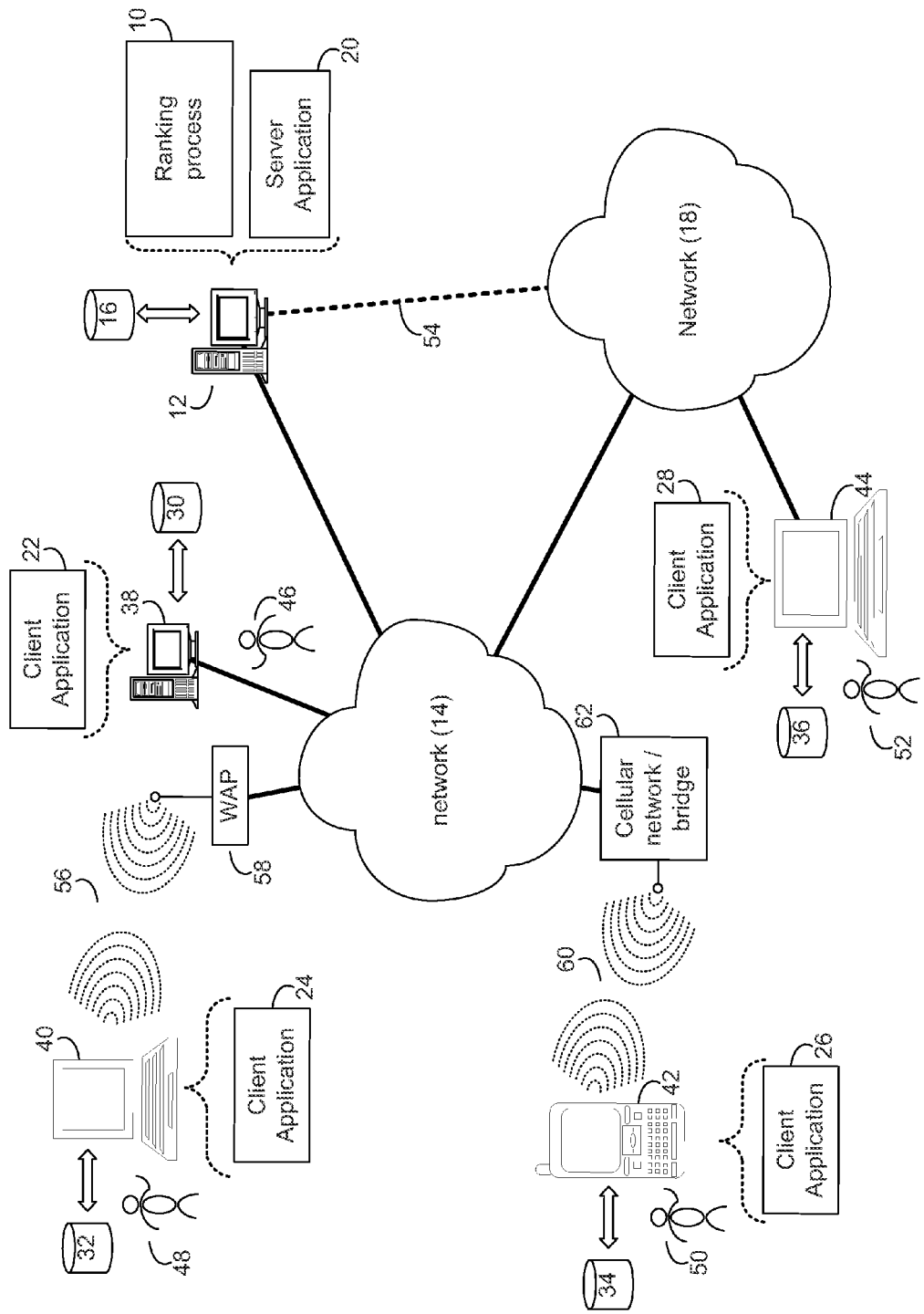
FIG. 1 is a diagrammatic view of a ranking process in accordance with an embodiment of the present disclosure.

Embodiments of the present disclosure are directed towards a system and method for ranking conversations so that those conversations that a user may be most interested in are available to them. In some embodiments, the process may include a number of signals, e.g., participant count, popularity of video owner (defined by number of followers on a social network the person has), and the affinity of the video viewer to the conversation participants. The process may apply a weight to each value and take the sum of the weighted values of each signal to get a ranking score. The results may be used in a web search ranking, a social networking website content ranking, etc.

Referring to FIGS. 1-5, there is shown a ranking process 10 that may reside on and may be executed by computer 12, which may be connected to network 14 (e.g., the Internet or a local area network). Server application may include some or all of the elements of ranking process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, ranking process 10 may include identifying (402), using one or more computing devices, a plurality of live social networking based communication sessions, each of the plurality of live social networking based communication sessions having multiple participants. Ranking process 10 may further include applying (404) at least one parameter to each of the plurality of live social networking based communication sessions. Ranking process 10 may also include determining (406) a non-adjusted value for the at least one parameter for each of the plurality of live social networking based communication sessions. Ranking process 10 may also include determining (408) whether the at least one parameter has been assigned a predetermined weight adjustment. If the at least one parameter has been assigned a weight adjustment, ranking process 10 may include adjusting (410) the value for the at least one parameter based upon, at least in part, the predetermined weight assigned to each of the at least one parameter. Ranking process 10 may further include generating (412) a combined value for each of the plurality of live social networking based communication sessions based upon, at least in part, one or more of the non-adjusted value and the adjusted value. Ranking process 10 may also include ranking (414) each of the plurality of live social networking based communication sessions based upon, at least in part, the combined value.

The instruction sets and subroutines of ranking process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Ranking process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), a television with one or more processors embedded therein or coupled thereto, and a dedicated network device (not shown).

One or more of client applications 22, 24, 26, 28 may be configured to effectuate some or all of the functionality of ranking process 10. Accordingly, ranking process 10 may be a purely server-side application, a purely client-side application, or a hybrid server-side/client-side application that is cooperatively executed by one or more of client applications 22, 24, 26, 28 and ranking process 10.

Users 46, 48, 50, 52 may access computer 12 and ranking process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking service. For example, the client devices 38, 40, 42, 44 can execute web browser applications that can be used to access the social networking service. In another example, the client devices 38, 40, 42, 44 may execute software applications that are specific to the social network (e.g., social networking "apps" running on smartphones).

The users 46, 48, 50, and 52 may participate in the social networking service provided by server device 12 by posting information, such as text comments (e.g., updates, announcements, replies), digital photos, videos, or other appropriate electronic information. In some implementations, information can be posted on a user's behalf by systems and/or services external to the social network or the server device 12. For example, the user 46 may post a review of a movie to a movie review website, and with proper permissions that website may cross-post the review to the social network on the user's 46 behalf. In another example, a software application executing on a mobile device, with proper permissions, may use global positioning system (GPS) capabilities to determine the user's location and automatically update the social network with his location (e.g., "At Home", "At Work", etc.).

Figure 2:
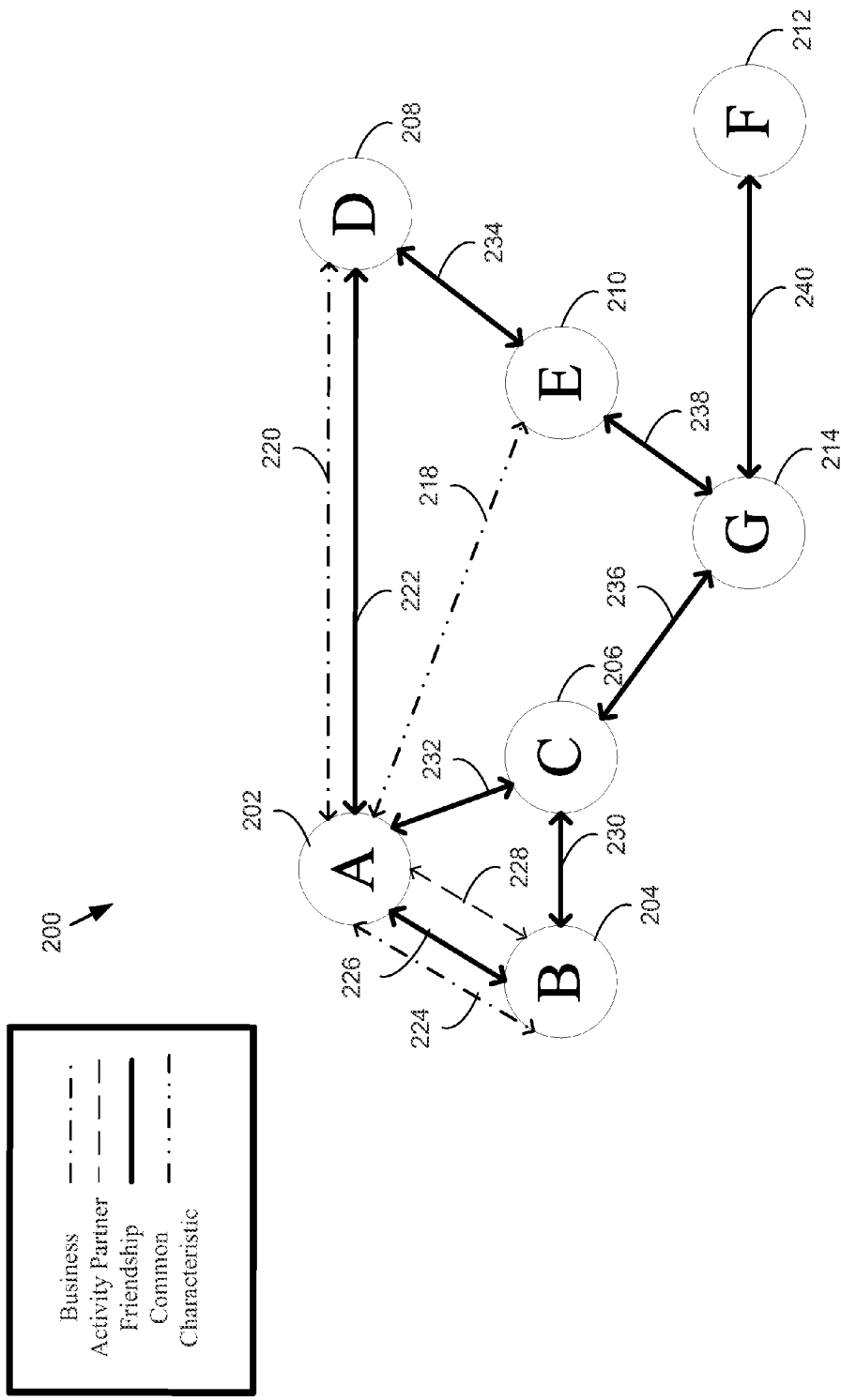
FIG. 2 is a diagrammatic view of a social network in accordance with an embodiment of the present disclosure.

Referring now to FIG. 2, a diagram of a social network 200 according to one embodiment of the present disclosure is provided. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, 234, 236, 238, and 240. The vertices 202, 204, 206, 208, 210, 212, and 214 may comprise profiles A, B, C, D, E, F, and G respectively.

As used herein, the phrase "social network profile" may refer to a member profile of a member of the social network 200. According to another embodiment, one or more of the vertices may represent a community. The methods and systems discussed below are equally applicable to an embodiment where the vertices may comprise one or more communities, but for purposes of illustration, the vertices depicted in FIG. 2 represent member profiles. The example network 200 shown in FIG. 2 has seven members. Considerably more members may be part of the social network 200. A member may be an entity such as, for example, a person, an organization, a business, a corporation, a community, a fictitious person, or other suitable entity.

In some embodiments, each member profile may contain entries, and each entry may comprise information associated with a profile. For example, a person's member profile may contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A particular business member profile may, for example, contain a description of the business, and information about its market sector, customer base, location, suppliers, net profits, net worth, number of employees, stock performance, contact information, and other types of suitable information associated with the business.

A member profile may also contain rating information associated with the member. For example, the member can be rated or scored by other members of the social network 200 in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. This membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used. Each member may be given the opportunity to opt out from providing any information that the member does not wish to share.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

In some embodiments, an association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may then accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Associations between profiles within a social network can be of a single type or can be multiple types and can include, for example, friendship associations, business associations, family associations, community associations, school associations, or any other suitable type of link between profiles. Associations may further be weighted to represent the strength of the association. For example, a friendship association can be weighted more than a school association. Each type of association can have various levels with different weights associated with each level. For example, a friendship association may be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

As discussed above, one or more of users 46, 48, 50, 52 may access computer 12 and ranking process 10 through network 14 or secondary network 18. For example, and for illustrative purposes only, assume that user 46 (i.e., the user of personal computer 38) wishes to use ranking process 10. User 46 may access ranking process 10 through client application 22 associated with personal computer 38. In this way, ranking process 10 may operate as a standalone application or alternatively as an applet or plug-in operating within a separate program such as server application 20. In some embodiments, server application 20 may include a social networking application. Although, this particular example focuses upon user 46 and personal computer 38 it should be noted that this disclosure is not meant to be limited to this particular example as laptop computer 40, smart phone 42, notebook computer 44, etc., may also be used to access and/or render some or all of the embodiments of display process 10 described herein.

Figure 3:
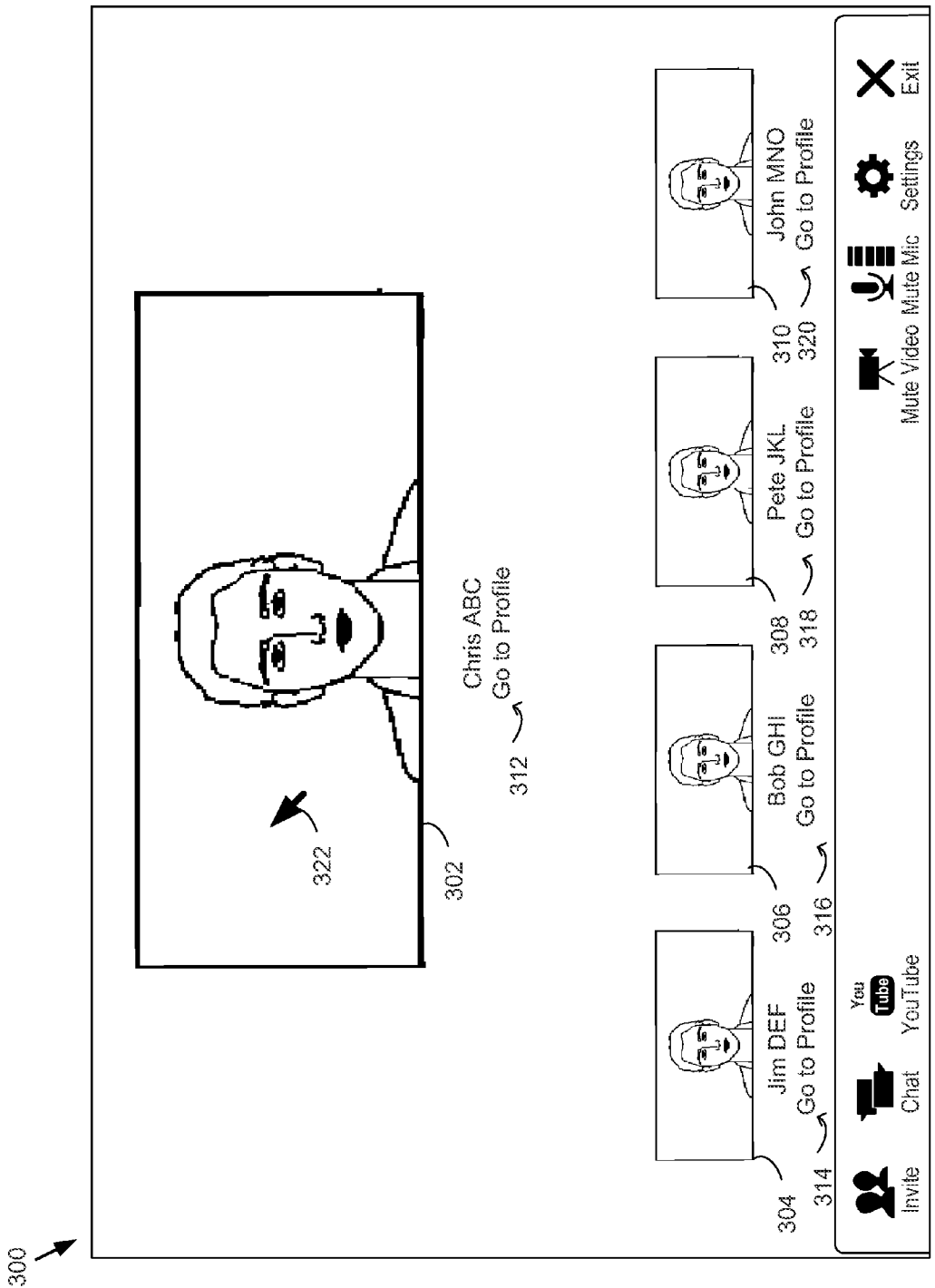
FIG. 3 is a diagrammatic view of an interface rendered by the ranking process of FIG. 1 in accordance with an embodiment of the present disclosure.
Figure 4:
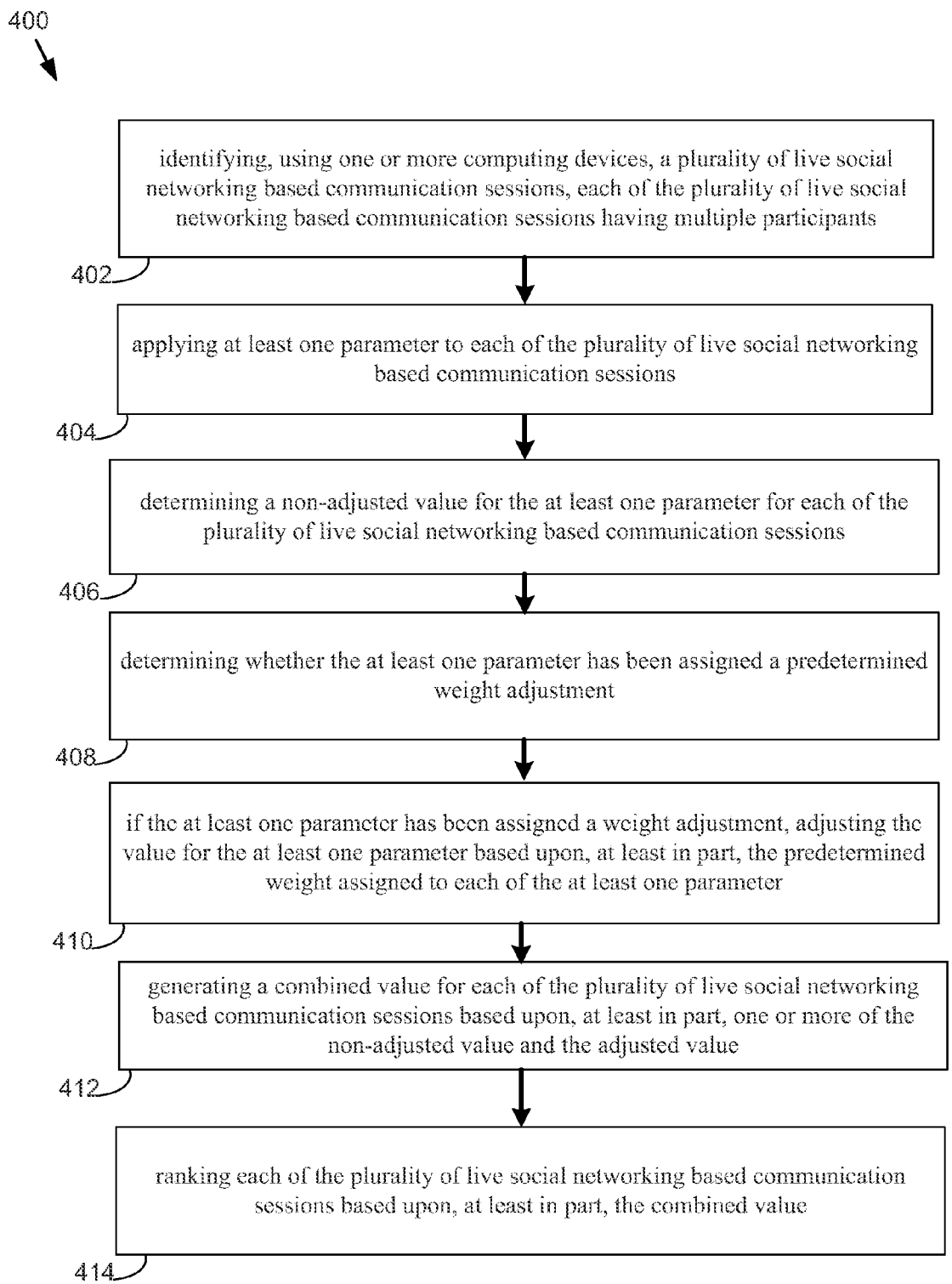
FIG. 4 is a flowchart of the ranking process of FIG. 1 in accordance with an embodiment of the present disclosure.

As such, and referring now to FIG. 3, when user 46 accesses server application 20 (e.g. social networking application) via client application 22 interface 300 may be rendered at personal computer 38. Interface 300 may include one or more participant interfaces (e.g. 302, 304, 306, 308, 310) each of which may be configured to display video, text, audio, and/or static avatars associated with a participant of an electronic communication session. For example, participant interface 302 may display video of Chris ABC, participant interface 304 may display video of Jim DEF, participant screen 306 may display video of Bob GHI, participant interface 308 may display a static avatar of Pete JKL, and participant interface 310 may display video of John MNO. In some embodiments, the participants' interfaces may be displayed in the order in which they entered the online video group discussion. Additionally and/or alternatively, the order or display of the interfaces may be based upon the results of ranking process 10 as is discussed in further detail in FIG. 5. Although, five participant interfaces are shown in this particular example it should be noted that any number may be displayed without departing from the scope of the present disclosure.

In some embodiments, each participant interface may have participant identification information associated therewith. For example, participant interface 302 may have identification information 312 rendered, in this case identifying the participant as Chris ABC. Similarly, participant interfaces 304, 306, 308, and 310 may each include corresponding identification information 314, 316, 318, and 320. As shown in FIG. 3, the identification information may include at least one of a participant's name and/or a link to a webpage associated with a participant (e.g., "Go to Profile"). Some or all of the identification information may or may not be accessible to the various participants of online video group discussion as is discussed in further detail hereinbelow.

In some embodiments, a server computing device such as computer 12 may host a plurality of these live, multi-participant, communication sessions, which may be transmitted over networks (e.g. networks 14 and 18 shown in FIG. 1) and may be broadcast at various computing devices (e.g. 38, 40, 42, 44, etc.). Embodiments of ranking process 10 may be used to rank these conversations in order to identify the most appropriate conversations for a particular user.

Accordingly, ranking process 10 may identify (402), using one or more computing devices, a plurality of live communication sessions (e.g. social networking based communication sessions). As discussed above, server computing device 12 may be configured to store information related to current and/or future communication sessions. This information may include, but is not limited to, date of the communication session, starting time and ending time of the communication session, the topic of the communication session, the organizer of the communication session, etc.

In some embodiments, ranking process 10 may apply (404) one or more parameters to each of the live communication sessions. The parameters may be based upon the information associated with each communication session.

In addition to the information discussed above, some parameters may include, but are not limited to, the number of participants in a live communication session, a popularity metric associated with an organizer of a live communication session (e.g. the number of followers a user may have on a social network), an affinity of a user to one or more live communication session participants, an affinity of a user to an organizer of a live communication session, an average watch time associated with an organizer of a live communication session, a reshare count, a comment count, a view count, and a user favorability count. It should be noted that these parameters are provided merely by way of example as any suitable parameter may be applied in accordance with the teachings of the present disclosure.

In some embodiments, ranking process 10 may determine (406) a non-adjusted value for the parameters for each of the plurality of live communication sessions. For example, given a first communication session involving a cooking class a second communication session involving a baseball focused talk show, and a third communication session involving a political discourse, ranking process may determine a value for each parameter. In this particular example, if one of the parameters is the number of participants and the first session includes 17 participants, the second session includes 2500 participants and the third session includes 312 participants, ranking process may determine that the third session has a value of (2), the second session has a value of (3) and the first session has a value of (1). In other words, the communication session having the greatest number of participants may receive the highest ranking.

Similarly, values may be determined for every parameter and for each communication session. Once all of the parameters have been determined, ranking process 10 may be configured to generate a combined value for each of the plurality of live communication sessions. The combined value may be the sum of the parameter values associated with each communication session.

In some embodiments, ranking process 10 may determine (408) whether the at least one parameter has been assigned a predetermined weight adjustment. For example, the number of participants may be more heavily weighted than the comment count and, as such, may have a multiplier associated therewith. In some embodiments, the weight may be user-selectable (e.g. if a user would prefer to see the most popular communication sessions he/she may set a higher importance upon the number of participants in a communication session. Additionally and/or alternatively, if the user is less interested in, for example, the popularity of the organizer of a video, this weight may be set at a lower importance and may therefore have a smaller multiplier associated therewith. It should be noted that this weight may be applied at any suitable time, for example, prior to the generation of the combined value.

In some embodiments, if the parameter has been assigned a weight adjustment, ranking process 10 may be configured to adjust (410) the value for the parameter based upon, at least in part, the predetermined weight that has been assigned. In some cases, no weight may be assigned or the same weight may be assigned to each parameter therefore resulting in no adjustment.

In some embodiments, ranking process 10 may be configured to generate (412) a combined value for each of the plurality of live social networking based communication sessions. This combined value may be based upon the non-adjusted value and/or the adjusted value. Accordingly, in the event that all parameters have been assigned the same weight ranking process 10 may utilize only the non-adjusted value.

Once the combined value for each communication session has been determined, ranking process 10 may be configured to rank (414) each of the live communication sessions. Using the example provided above, in some embodiments, this may involve comparing the combined values for each communication session and providing the ranking to one or more users. Additionally and/or alternatively, ranking process 10 may utilize the ranking in order to determine the most appropriate communication sessions for a particular user.

Accordingly, ranking process 10 may utilize the ranking in order to provide a web search ranking, social networking content ranking, or in any other suitable fashion. In this way, a user's social networking profile may be linked to a web search or social networking search in order to effectuate the ranking process described herein.

Figure 5:
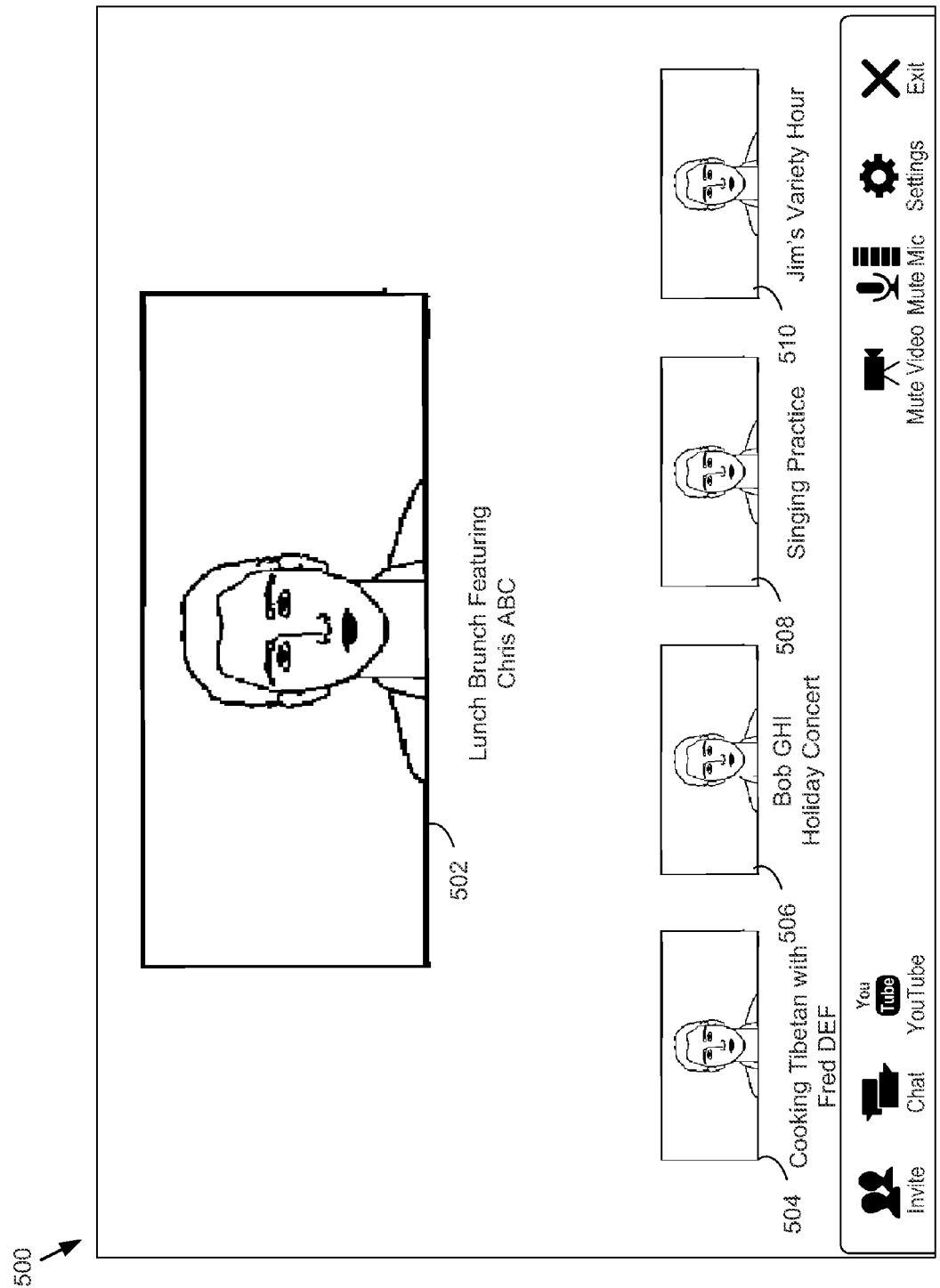
FIG. 5 is a diagrammatic view of an interface rendered by the ranking process of FIG. 1 in accordance with an embodiment of the present disclosure.

For example, and referring now to FIG. 5, an embodiment of an interface 500 associated with ranking process 10 is depicted. Interface 500 may be generated and presented to one or more users such as user 46 shown in FIG. 1. In accordance with ranking process 10 one or more communications sessions may be generated (e.g. communication session interfaces 502, 504, 506, 508, and 510). In this particular embodiment, ranking process 10 may scan through all of the current and/or future communications sessions to determine that the "Lunch Brunch Featuring Chris ABC" may be of most interest to user 46 based upon the factors identified herein. As such, communication session interface 502 may be more prominently displayed to the user. Similarly, communication session interfaces 504, 506, 508, and 510 may be presented to the user in the order in which ranking process 10 has determined are of greatest interest to user 46.

In some embodiments, the applied parameter may be focused upon a potential user's particular interests. These interests may be obtained from various sources. For example, from the user's social networking profile or from transcriptions of audio or video conversations that the user has been a member of. In this way, keywords (either from the profile, transcription, etc.) may be compared to the description of the communication session in order to determine whether there is a commonality.

Additionally and/or alternatively, ranking process 10 may be configured to determine a commonality metric between a user's interests and a transcription of audio associated with a live communication session. In this particular example, the live communication session may have started and a transcription created. The words of this transcription may be compared to the user's interests or other information associated with the user in order to determine the likelihood of that particular communication session being of interest. Communication sessions having a higher commonality metric may receive a higher value, which may result in an adjusted ranking.

In some embodiments, some or all of the user devices described herein may be electronically coupled to an electronic communication session. For example, the electronic communication session may be server application 20 running on server computing device 12. In this way, user devices, 38, 40, 42, 44, 500 may communicate with server application 20 via one or more networks, for example, network 14, 18, etc.

The present disclosure is not intended to be limited to the example provided above as any number of modalities and combinations of modalities may be used without departing from the scope of the present disclosure. Some modalities may include, but are not limited to, video-based, audio-based, text-based and hybrid modalities.

Additionally and/or alternatively, any number of participants may be included within the electronic communication session. And some or all of the participants may be participating in the session using any suitable mode of communication. Accordingly, multiple synchronous and asynchronous communication messages may be transmitted of any modality type and any number of modality conversions may occur during a particular electronic communication session.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
identifying, using one or more computing devices, a plurality of current communication sessions based at least upon a starting time of each of the plurality of current communication sessions, each of the plurality of current communication sessions having multiple participants;
transcribing audio or video from at least a portion of each of the plurality of current communication sessions;
identifying one or more keywords from transcribed audio or video;
applying at least one parameter to each of the plurality of current communication sessions, the at least one parameter including a commonality metric;
determining a non-adjusted value for the at least one parameter for each of the plurality of current communication sessions, wherein determining the non-adjusted value for the commonality metric comprises comparing the one or more keywords to an interest of a user;
determining whether the at least one parameter has been assigned a predetermined weight adjustment;
if the at least one parameter has been assigned a predetermined weight adjustment, adjusting the non-adjusted value to generate an adjusted value for the at least one parameter based at least upon the predetermined weight adjustment assigned to the at least one parameter;
generating a combined value for each of the plurality of current communication sessions based at least upon one or more of the non-adjusted value and the adjusted value;
ranking each of the plurality of current communication sessions based at least upon the combined value;
providing the ranking to the user;
receiving from the user a selection of a first current communication session from the ranking; and
providing a video stream of the first current communication session to the user.

2. The computer-implemented method of claim 1, wherein the at least one parameter further includes a popularity metric associated with an organizer of a current communication session.

3. The computer-implemented method of claim 2, wherein the popularity metric includes a number of followers on a social network.

4. The computer-implemented method of claim 1, wherein the at least one parameter further includes one or more of a view count, a reshare count, a comment count, and a user favorability count.

5. The computer-implemented method of claim 1, wherein the at least one parameter further includes a number of the multiple participants in a current communication session.

6. The computer-implemented method of claim 1, wherein the at least one parameter further includes an affinity of the user to one or more of the multiple participants in a current communication session.

7. The computer-implemented method of claim 1, wherein the at least one parameter further includes an affinity of the user to an organizer of a current communication session.

8. The computer-implemented method of claim 1, wherein the at least one parameter further includes an average watch time associated with an organizer of a current communication session.

9. The computer-implemented method of claim 1, wherein the interest of the user is determined from a transcription of audio or video conversations that the user participated in.

10. The computer-implemented method of claim 1, further comprising presenting an image associated with at least one of the plurality of current communication sessions more prominently than one or more other images associated with others of the plurality of current communication sessions.

11. A computing system, comprising:
one or more processors; and
a storage device coupled to the one or more processors that stores instructions that, when executed by the one or more processors, cause the one or more processors to:
identify a plurality of current social networking based communication sessions based at least upon a starting time of each of the plurality of current social networking based communication sessions, each of the plurality of current social networking based communication sessions having multiple participants;
apply at least one parameter to each of the plurality of current social networking based communication sessions, the at least one parameter associated with a user of a social networking service and including a commonality metric;
determine a non-adjusted value for the at least one parameter for each of the plurality of current social networking based communication sessions, wherein the commonality metric is determined based on transcription of audio or video from each of the plurality of communication sessions and an interest of the user;
determine whether the at least one parameter has been assigned a predetermined weight adjustment;
adjust the non-adjusted value to generate an adjusted value for the at least one parameter based at least upon the predetermined weight adjustment assigned to each of the at least one parameter if the at least one parameter has been assigned a predetermined weight adjustment;
generate a combined value for each of the plurality of current social networking based communication sessions based at least upon one or more of the non-adjusted value and the adjusted value;
rank each of the plurality of current social networking based communication sessions based at least upon the combined value;
transmit a ranking of each of the plurality of current social networking based communication sessions to a client device associated with the user over a network;
receive from the user a selection of a first current social networking based communication session from the ranking; and
provide a video stream of the first current social networking based communication session to the user.

12. The computing system of claim 11, wherein the at least one parameter further includes one or more of a view count, a reshare count, a comment count, and a favorability count associated with the user.

13. The computing system of claim 11, wherein the at least one parameter further includes a number of the multiple participants in a current social networking based communication session.

14. The computing system of claim 11, wherein the at least one parameter further includes a popularity metric associated with an organizer of a current social networking based communication session.

15. The computing system of claim 11, wherein the at least one parameter further includes an affinity of the user to one or more of the multiple participants in a current social networking based communication session.

16. The computing system of claim 11, wherein the at least one parameter further includes an affinity of the user to an organizer of a current social networking based communication session.

17. The computing system of claim 11, wherein the at least one parameter further includes an average watch time associated with an organizer of a current social networking based communication session.

18. The computing system of claim 11, wherein the interest of the user is determined from transcriptions of audio or video conversations that the user participated in.

19. The computing system of claim 11, wherein the instructions further cause the one or more processors to:
receive, via the network, an indication of a web search associated with the user from the client device; and
transmit, via the network and in response to the indication of the web search, the ranking of each of the plurality of current social networking based communication sessions to the client device as web rankings of each of the plurality of current social networking based communication sessions.

20. A computer-implemented method comprising:
identifying, using one or more computing devices, a plurality of current social networking based communication sessions based at least upon a starting time of each of the plurality of current social networking based communication sessions, each of the plurality of current social networking based communication sessions having multiple participants;
transcribing audio or video from at least a portion of each of the plurality of current social networking based communication sessions;
identifying one or more keywords from transcribed audio or video;
applying a plurality of parameters to each of the plurality of current social networking based communication sessions, the plurality of parameters including a number of the multiple participants, a popularity level of an organizer of each of the plurality of current social networking based communication sessions, an affinity of a user to the multiple participants associated with each of the plurality of current social networking based communication sessions, and a commonality metric;
determining a value for each of the plurality of parameters for each of the plurality of current social networking based communication sessions, wherein determining the value for the commonality metric comprises comparing the one or more keywords to an interest of the user;
generating a combined value for each of the plurality of current social networking based communication sessions;
ranking each of the plurality of current social networking based communication sessions based at least upon the combined value;
providing the ranking to the user;
receiving from the user a selection of a first current social networking based communication session from the ranking; and
providing a video stream of the first current social networking based communication session to the user.

* * * * *